United States Patent [19]

Langhammer

[11] 4,097,028
[45] Jun. 27, 1978

[54] METHOD OF MELTING AND APPARATUS THEREFOR

[75] Inventor: Hans-Jürgen Langhammer, Platjenwerbe, Germany

[73] Assignee: Klockner-Werke AG, Duisburg, Germany

[21] Appl. No.: 651,526

[22] Filed: Jan. 22, 1976

[30] Foreign Application Priority Data

Feb. 6, 1975 Germany .......................... 2504946

[51] Int. Cl.² ............................................. C21B 7/16
[52] U.S. Cl. ........................................ 266/47; 75/145;
266/197; 266/219; 266/222; 266/268; 266/900
[58] Field of Search ................. 13/9; 75/10 R, 11, 12, 75/43, 445, 59, 60, 65 R; 266/47, 197, 218, 219, 222, 267, 268, 900, 901

[56] References Cited

U.S. PATENT DOCUMENTS

| | | | |
|---|---|---|---|
| 386,269 | 7/1888 | Sahler | 266/138 |
| 1,117,274 | 11/1914 | Stoughton | 266/900 X |
| 2,960,330 | 11/1960 | Löbbecke | 266/219 |
| 3,197,539 | 7/1965 | Hinds | 13/9 |
| 3,701,517 | 10/1972 | Gray | 266/222 |
| 3,706,549 | 12/1972 | Knuppel et al. | 266/245 X |
| 3,811,386 | 5/1974 | Knuppel et al. | 266/268 X |
| 3,817,505 | 6/1974 | LeRoy et al. | 266/268 |
| 3,819,164 | 6/1974 | Wells et al. | 266/47 |
| 3,819,165 | 6/1974 | Courard et al. | 266/268 |
| 3,829,073 | 8/1974 | Courard | 266/268 |
| 3,844,768 | 10/1974 | LeRoy et al. | 75/59 |
| 3,895,785 | 7/1975 | Kolb et al. | 266/222 X |
| 3,948,642 | 4/1976 | Gross | 75/445 X |
| 3,954,254 | 5/1976 | Zimmermann | 266/192 X |

FOREIGN PATENT DOCUMENTS

500,581  1/1951  Belgium .............................. 266/197

*Primary Examiner*—Roy Lake
*Assistant Examiner*—Paul A. Bell
*Attorney, Agent, or Firm*—Michael J. Striker

[57] ABSTRACT

A charge is admitted into a shaft furnace so as to form a charge column therein. The lower end of the column is melted with a flame and the charge moves downwardly by gravity as melting proceeds. The flame is generated by admitting one or more streams of oxygen and one or more streams of fuel into the furnace. A stream of oxygen and a stream of fuel are admitted into the furnace as a pair and in such a manner that the respective oxygen stream is surrounded by the respective fuel stream. This procedure provides the result that the fuel entering the furnace withdraws so much heat from the surroundings that water-cooling of the burners may be eliminated. Moreover, the withdrawal of heat from the surroundings serves to cool the furnace wall in the regions of the burners sufficiently for molten material flowing on the furnace wall in these regions to solidify. Consequently, protuberances are formed on the furnace wall. The charge column is supported on these protuberances which provides the advantage that the charge column does not contact the molten material at the bottom of the furnace. In addition to this effect, the protuberances serve to protect the furnace lining by forming a thermal shield therefor. The size of the protuberances can be controlled by partially pre-mixing the oxygen and the fuel and by regulating the rate of expansion and flow rate of the oxygen and fuel. In order to permit the oxygen and fuel to be admitted into the furnace in the manner outlined, the burner or burners may be constructed with plural openings which are arranged such that the opening through which the oxygen enters the furnace is at least partially surrounded by the opening or openings through which the fuel enters the furnace. One embodiment contemplates an annular burner having a central slit for the admission of oxygen into the furnace and two slits for fuel which flank the oxygen slit. Another embodiment contemplates a plurality of individual burners which are constructed in the form of double-walled conduits.

5 Claims, 7 Drawing Figures

METHOD OF MELTING AND APPARATUS THEREFOR

BACKGROUND OF THE INVENTION

The invention relates generally to a method of and arrangement for melting substances, especially scrap, sponge iron, pellets or the like. Of particular interest to the invention is the melting of substances in shaft furnaces.

It is known to melt a charge in a shaft furnace by forming a column of the charge in the furnace and then melting the column from below with a central flame. The flame may be produced by one or more burners.

From the German Pat. No. 1,800,610, it is known to continuously melt scrap in a shaft furnace having an approximately constant cross-sectional area. A column of scrap is formed in the shaft furnace and the column is melted from below with a central fuel-oxygen flame having a saucer-like configuration. Melting proceeds with counter-current motion in the sense that the charge descends in the shaft furnace by gravity while the gases of combustion rise through the furnace.

The charge column is supported in the furnace in that the peripheral region of the lower end of the column bears against the bottom of the furnace adjacent the periphery of the latter. Thus, the heat generated by the extremely hot flame is concentrated at the center of the column and is less intense at the peripheral region thereof. As a consequence of these effects and, in particular, the presence of the peripheral region of the column between the flame and the lining, the fire-resisting lining of the vertical wall of the shaft furnace is protected against the flame. The fire-resisting lining of the bottom of the furnace is here protected by the molten material which is present at the bottom of the furnace and which is continuously flowing out of the furnace.

By melting in the manner described above, it becomes possible to continuously renew the peripheral region of the lower end of the column, which region is formed of scrap to be melted and serves to protect the fire-resisting lining of the vertical wall of the furnace. The peripheral region of the column not only protects the lining from the action of the flame but also against the action of the FeO slag which forms during melting.

The flame in the above-described method is generated by a central burner positioned on the axis of the furnace and which is introduced into the furnace through either the bottom or the top thereof. However, there are certain disadvantages associated with the introduction of a burner into a furnace in the manners just described. The disadvantages of a central burner which is introduced into the furnace from the top reside in that the cross-sectional area available for the charge is reduced and the guide mechanisms for the burner must be located on the axis of the furnace. Another disadvantage resides in that the possibilities for control over damage are poor and that, consequently, there exists the eventual danger of explosions (water, oxygen, oil). There is also a further disadvantage in that it is difficult to change the burner. Insofar as a burner which is introduced into the furnace from the bottom is concerned, this is even more difficult to gain access to than a burner introduced into the furnace from the top.

In the Belgian Pat. No. 814,312 it has been proposed that a flame of annular configuration be used for furnaces of large cross-sectional area so that the charge column is supported centrally and bears against the middle of the furnace instead of being supported at the peripheral region thereof and bearing against the furnace in the vicinity of the furnace wall. This arrangement, however, has the disadvantage that the wall of the furnace is unprotected in the melting region and, consequently, is exposed to the radiation from the flame and to the FeO slag which flows off. As a result, the fire-resisting lining of the shaft furnace is subjected to great wear.

SUMMARY OF THE INVENTION

It is an object of the invention to provide a melting method and a melting arrangement which enable the wear on the wall of the furnace to be maintained at a relatively low level while permitting good control of and ready access to the burner or burners to be achieved.

Another object of the invention is to provide a method and arrangement of the type described above which enable a central flame to be obtained without the use of burners which are introduced into the furnace centrally and which method and arrangement concomitantly enable the fire-resisting lining of the shaft furnace to be protected.

These objects, as well as others which will become apparent, are achieved in accordance with the invention. According to one aspect of the invention there is provided a melting method wherein a charge is admitted into a melting zone and melted with a flame. The flame is generated by introducing at least one stream of oxygen and at least one stream of fuel into the zone. The introduction of the oxygen and the fuel is effected in such a manner for at least part of the melting period that the oxygen stream is at least in part bounded by a layer formed from the fuel stream upon entry of the stream into the melting zone.

Preferably, the major part of the fuel stream bounds the major part of the oxygen stream for at least part of the melting period and, advantageously, substantially all of the fuel stream bounds substantially all of the oxygen stream for the major part of the melting period.

As indicated previously, of particular interest to the invention is a method of melting a column of charge material, especially scrap, sponge iron, pellets or the like, from below in a shaft furnace by means of a central flame generated by one or more burners. Of particular interest to the invention also is an arrangement for carrying out this method. The description herein will accordingly be primarily with reference to a shaft furnace or, in other words, a melting zone having a substantially vertical orientation.

In accordance with a preferred embodiment of the invention, the objects of the invention are achieved in that the fuel and the oxygen are admitted into the melting region form peripherally or from the side with the admitted oxygen being accommodated within the admitted fuel. The charge material forms a column in the melting zone and the column of charge material bears against and is supported by a wall-like protuberance, or by wall-like protuberances, which are formed about the fuel-oxygen inlet or inlets. Favorably, a fuel-oxygen inlet is substantially completely bounded by such a wall-like protuberance.

With the above manner of admitting fuel into the melting region, the fuel coming out of the burners absorbs so much heat from the surroundings that, on the one hand, a water-cooling of the burner arrangement becomes unnecessary. On the other hand, wall-like protuberances may be formed from molten material adjacent the opening or openings through which the fuel and oxygen enter the melting zone. Thus, the fuel coming out of the burners absorbs sufficient heat from the surroundings that molten material present in the vicinity of the opening or openings through which the fuel and oxygen enter the melting zone is able to solidify thereby causing protuberances to be formed. The protuberances form a durable protective shell for the fire-resisting lining of the shaft furnace. These wall-like protuberances protect the fire-resisting lining in the melting region and, at the same time, support the charge column on the furnace wall. By virtue of the fact that, in accordance with a preferred embodiment of the invention, the oxygen and the fuel are admitted into the melting region from peripherally and, concomitantly, the burner arrangement is positioned at the side or periphery of the furnace, the burner arrangement is readily accessible and, further the burner arrangement is protected against damage by the wall-like protuberances.

The thickness of the wall-like protuberances may be regulated by a partial pre-mixing of the fuel and oxygen and/or by varying the rate of expansion and the flow rate.

In order to obtain a good mixing of the fuel and the oxygen, it is advantageous to impart a spinning or swirling motion to the fuel and/or the oxygen before the fuel and the oxygen leave the burners.

Insofar as the flame is concerned, it is favorable when a central flame of approximately lens-like configuration is used which impinges the column of the charge material and which is formed above the bottom of the melting chamber and beneath the charge column.

In order to interrupt the melting operation, which is normally undertaken continuously with the molten material concomitantly flowing out of the melting chamber continuously, it is of advantage for nitrogen or compressed air to be introduced into the melting zone instead of fuel and oxygen.

In order to enhance the formation of the protective wall-like protuberances, it is possible to cool the furnace wall in known manner with air or water in the region of the protuberances.

Another aspect of the invention relates to a melting arrangement. A melting arrangement according to the invention includes wall means defining a melting zone and burner means for melting a charge in the melting zone. The burner means comprises first admitting means for admitting a first fluid stream into the melting zone and second admitting means for admitting a second fluid stream into the melting zone. The second admitting means at least in part bounds the first admitting means. The arrangement according to the invention is particularly well-suited for carrying out the method in accordance with the invention.

A preferred embodiment of the invention contemplates the use of a shaft furnace or, in other words, a wall means which includes a peripheral wall of substantially vertical orientation, having a burner device in the vicinity of the melting region positioned for the impingement of a charge column from below. The arrangement according to this embodiment of this invention is characterized in that the burner device is formed of an annular burner or of a plurality of individual burners which are arranged in the form of an annulus. The burner or burners have an opening for the introduction of oxygen into the furnace and one or two openings for the introduction of fuel into the furnace. The opening or openings for the fuel surround or bound the opening or openings for the oxygen.

It has been found to be advantageous when the burners are composed of copper, at least in the region of the outlet openings, that is, the openings through which the oxygen and the fuel are admitted into the furnace. It is favorable, especially when using a plurality of individual burners, for double-walled conduits of copper to be utilized as burners. Means may be provided in the double-walled conduits for imparting a spinning or swirling motion to the gases leaving the conduits. For this purpose, the inner conduit of a burner may be provided with a spiral or helical element or coil composed, for instance, of copper wire. In particular, the spiral or helical element may be arranged so as to extend about the outer circumference of the inner conduit. The spiral or helical element may simultaneously serve as a spacing element for centering the inner conduit with respect to the outer conduit.

The inner conduit of a double-walled conduit may further be slidably mounted in the outer conduit of the double-walled conduit. In this manner, it is possible to achieve a pre-mixing of the fuel and oxygen within certain limits prior to the exit of these gases from the burners. The pre-mixing effect obtained is in correspondence to the amount by which the inner and outer conduits have been slidably displaced relative to one another. It is also possible, for the same purpose, for the inner conduit to be provided with a perforate region. If necessary or desirable the inner conduit may be provided with a perforate region in addition to being slidably mounted in the outer conduit.

Advantageously, the burners are inclined downwardly at a small angle, preferably an angle of the order of 10° to 20°. It is further favorable for the walls of the shaft furnace to be provided with cooling means in the region of the wall-like protuberances or the region of the openings for the admission of the fuel and the oxygen into the furnace so as to enhance the formation of the wall-like protuberances.

The novel features which are considered as characteristic for the invention are set forth in particular in the appended claims. The invention itself however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
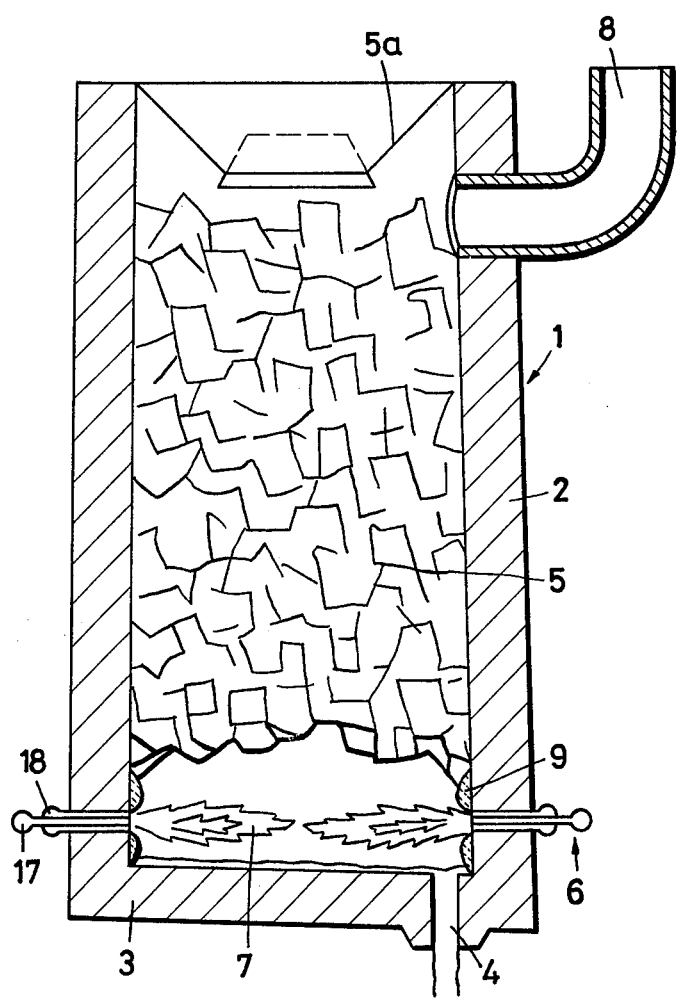
FIG. 1 schematically illustrates a shaft furnace which may be used, for example, for the melting of scrap.

Referring first to FIG. 1 of the drawing, it is pointed out that the reference numeral 1 generally identifies a cylindrical shaft furnace. The furnace 1 has a peripheral wall or side walls 2 and a bottom wall 3. The furnace 1 may have a substantially uniform cross-sectional area along its length but, in the illustrated embodiment, is shown as widening slightly in downward direction. In any event, the furnace 1 has an approximately constant cross-sectional area along its length.

The peripheral wall 2 and the bottom wall 3 of the furnace 1 are lined with fire-resisting material. An outlet 4 for molten material is provided in the bottom wall 3.

Interiorly of the furnace 1 there is accommodated a column 5 of charge material such as, for instance, scrap. The charge material is introduced into the furnace 1 via a charging arrangement 5a located in the upper portion of the furnace 1.

In the peripheral wall 2 of the furnace 1 there is provided a burner arrangement 6 at a location spaced upwardly from the bottom 3 of the furnace 1. The burner arrangement 6 may comprise an annular burner or, on the other hand, may comprise a plurality of circumferentially spaced individual burners which are arranged in the form of a ring or annulus in the peripheral wall 2 of the furnace 1 at a location above the bottom wall 3. Oxygen and fuel such as, for instance, natural gas or fuel oil, are admitted into the furnace 1 from the burner arrangement 6. As a result, a flame 7 of approximately lens-like configuration is generated above the bottom wall 3 of the furnace 1 and below the column 5 of charge material. The flame 7 impinges and melts the column 5 of charge material from below.

The waste gases or combustion gases produced in the furnace 1 are withdrawn from the latter in the region of the upper portion thereof via an exhaust conduit 8.

It will be seen that wall-like protuberances 9 are formed on the inner surface of the peripheral wall 2 of the furnace 1. For a burner arrangement 6 which comprises a burner of annular configuration, the wall-like protuberances 9 are formed above and below the burner of annular configuration. On the other hand, for a burner arrangement 6 which comprises a plurality of individual burners, the wall-like protuberances 9 are formed about, that is, surround, the individual burners.

The wall-like protuberances 9 are formed from molten material which has been obtained from the charge column 5 and which has again solidified. As explained earlier, by introducing fuel into the melting region according to the invention, the fuel absorbs so much heat from the surroundings that molten material which travels to the region where the burner arrangement 6 opens into the furnace 1 is capable of solidifying. Thus, molten material from the charge column 5 which flows down the inner surface of the peripheral wall 2 of the furnace 1 to the region of the burner arrangement 6 solidifies in the vicinity of the latter thereby causing the formation of the wall-like protuberances 9.

The column 5 of charge material bears against and is supported by the protuberances 9. The charge material at the lower end of the column 5, which is located immediately above the flame 7, is welded together by virtue of the heat from flame 7. In other words, the intensity of the heat from flame 7 is sufficient to cause the individual particles of the charge to be welded to one another in the region of the lower end of the column 5. The welding effect is schematically indicated by the heavy lines in FIG. 1. Due to the welding effect, a support network is formed at the lower end of the column 5 and, in this manner, the charge material above the lower end of the column 5 is supported in the furnace 1.

By virtue of the fact that the column 5 of charge material is supported by the protuberances 9, the column 5 may be prevented from abutting the bottom wall 3 of the furnace 1 and, concomitantly, may be prevented from being immersed in the molten material present on the bottom wall 3 of the furnace 1 which continuously flows out of the latter via the outlet 4. The protuberances 9 simultaneously serve as protection for the fire-resisting lining of the peripheral wall 2 of the shaft furnace 1.

Figure 2:
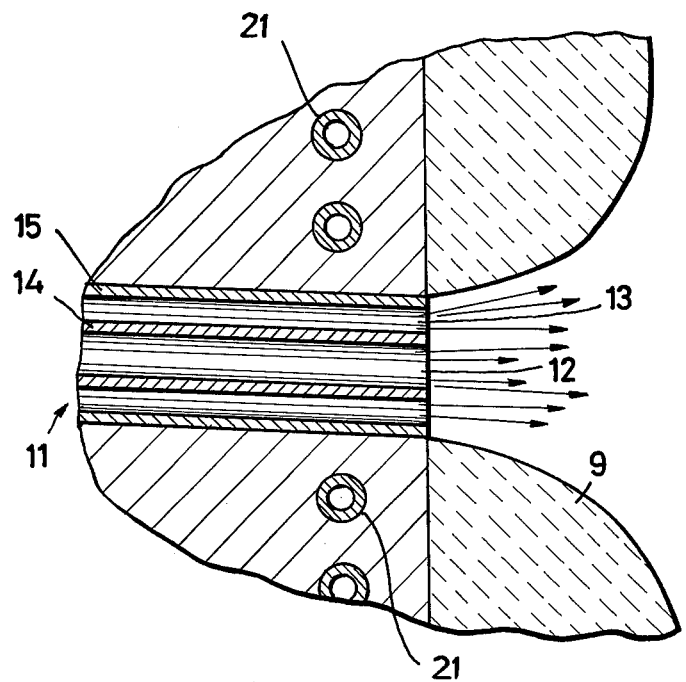
FIG. 2 is a section in the region of one of the burner arrangements of FIG. 1.
Figure 3:
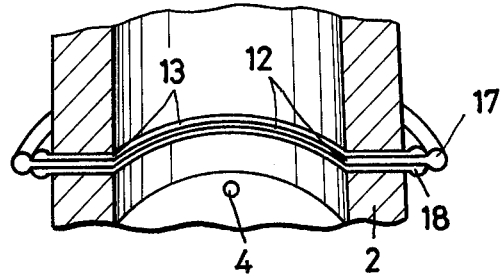
FIG. 3 shows one form of a burner arrangement according to the invention.
Figure 4:
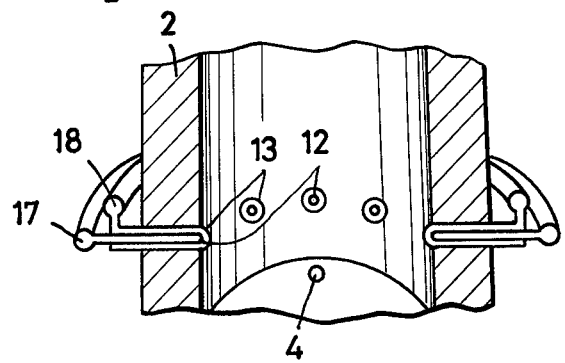
FIG. 4 shows another form of a burner arrangement according to the invention.

Referring now to FIGS. 2 – 4, it may be seen that the burner arrangement 6 is provided with outlet openings 12 for oxygen and outlet openings 13 for fuel. The oxygen outlets 12 are surrounded or bounded by the fuel outlets 13. According to one embodiment of the invention, as represented by FIG. 3, the burner arrangement 6 comprises an annular burner and the oxygen outlet 12 is in the form of an annular or ring-like slit. The fuel outlets 13, which bound the oxygen outlet 12, are of a corresponding shape, that is, the fuel outlets 13 are also in the form of annular or ring-like slits. According to another embodiment of the invention, as represented by FIGS. 2 and 4, the burner arrangement 6 comprises a plurality of individual burners which are preferably arranged in the form of a ring or annulus. Here, the oxygen outlets 12 are of circular configuration. The fuel outlets 13, which extend around or bound the oxygen outlets 12, are again of a corresponding shape, that is, the fuel outlets 13 are of a circular or an annular configuration.

The fuel admitted into the furnace 1 withdraws so much heat from the surroundings upon leaving the burner arrangement 6 via the fuel outlets 13 that, on the one hand, it is not necessary to provide for water-cooling of the burner arrangement 6. On the other hand, the fuel admitted into the furnace 1 withdraws sufficient heat from the surroundings that the wall-like protuberances 9, which are formed from the molten metal in the furnace 1 and which provide a durable protective shell for the lining of the peripheral wall 2 of the furnace 1, are caused to grow adjacent the fuel outlets 13. For the embodiment of FIG. 3, the protuberances 9 will form above the upper fuel outlet 13 and below the lower fuel outlet 13 and, hence, the protuberances 9 may here be in the form of a pair of approximately annular protuberances. For the embodiment of FIGS. 2 and 4, the protuberances 9 will form around the individual fuel outlets 13 and, accordingly, the protuberances 9 may be in the form of a plurality of approximately circular protuberances. The size of the protuberances 9 may be regulated to a certain degree by pre-mixing the fuel and the oxygen and may also be regulated by varying the rates of expansion and the flow rates of the gases entering the furnace 1.

As indicated earlier, according to one embodiment of the invention as represented by FIG. 3, the burner arrangement 6 may comprise an annular or ring-shaped slit burner. As may be seen from FIG. 3, the slit-shaped outlet 12 for oxygen is, in this embodiment, arranged within or between two slit-shaped outlets 13 for fuel. The oxygen outlet 12 is connected with a ring-shaped or annular inlet conduit for oxygen whereas both of the slit-shaped fuel outlets 13 are connected with a corresponding inlet conduit 18 for fuel, that is, the fuel inlet conduit 18 is also of ring-shaped or annular configuration.

As also indicated previously, another embodiment of the invention, as represented by FIGS. 2 and 4, contemplates for the burner arrangement 6 to include a plurality of individual burners. The individual burners of the burner arrangement 6 are generally identified by the reference numeral 11.

Figure 5:
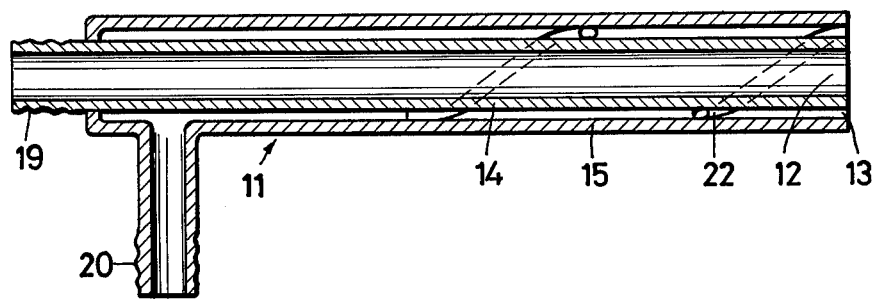
FIGS. 5 – 7 illustrate various embodiments of individual burners in accordance with the invention.
Figure 6:
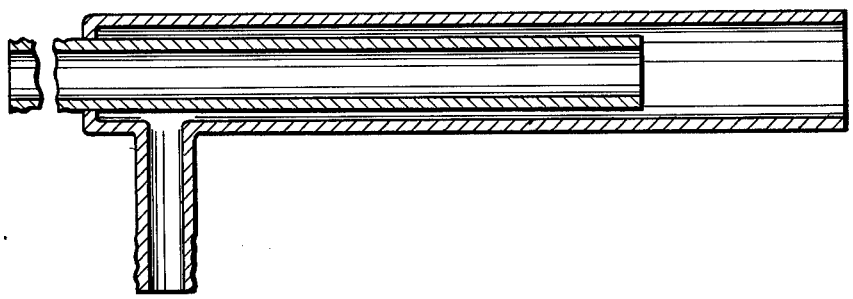
Figure 7:
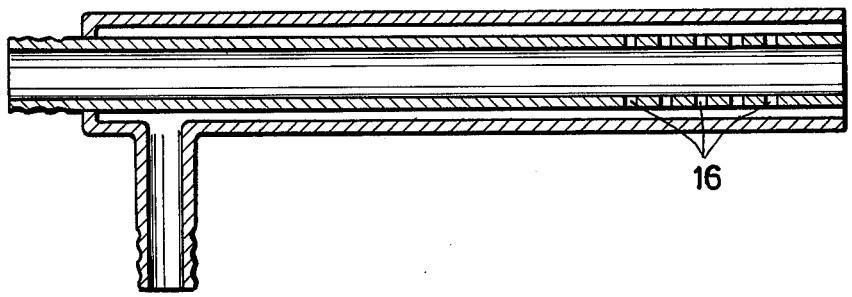

FIGS. 5 - 7, which illustrate various embodiments for the burners 11, indicate that the burners 11 are favorably in the form of double-walled conduits. The burners 11 here include an inner conduit 14 having an end which defines an outlet 12 for oxygen and an outer conduit 15 which, together with the outer surface of the inner conduit 14, defines a ring-shaped or annular outlet 13 for fuel. As best seen from FIG. 4, the inner conduit 14, whose end defines an outlet 12 for oxygen, is connected with an inlet conduit 17 for oxygen. On the other hand, the outer conduit 15 which, together with the inner conduit 14 defines an outlet 13 for fuel, is connected with an inlet conduit 18 for fuel.

The inner conduit 14 is provided with a suitably configuration portion 19 for the purpose of connecting the inner conduit 14 to the oxygen inlet conduit 17. The inner conduit 14 may, if necessary or desirable, be connected to the oxygen inlet conduit 17 via a check valve. The outer conduit 15 is provided with an adapter section which, similarly to the inner conduit 14, includes a suitably configurated portion 20 for the purpose of connecting the outer conduit 15 to the fuel inlet conduit 18. The outer conduit 15 may, if necessary or desirable, be connected to the fuel inlet conduit 18 via a check valve.

The cross-sectional areas of the inner conduit 14 and the outer conduit 15 are related to one another in dependence upon the desired relationship between the fuel and the oxygen. In particular, the cross-sectional areas of the inner conduit 14 and the outer conduit 15 may be selected so that the outlets 12 and 13 for oxygen and fuel, respectively, have the same cross-sectional areas.

Advantageously, the burners according to both the embodiment of FIG. 3 and the embodiment of FIGS. 4 - 7 are composed of copper at least in the region of the outlets 12 and 13 for oxygen and fuel, respectively. The individual burners 11 illustrated in FIGS. 5 - 7 are favorably composed entirely of copper.

The inner conduit 14 of a burner 11 may be slidably mounted with respect to the outer conduit 15 of the burner 11. FIG. 6 illustrates a burner 11 which is constructed in this manner and shows the burner 11 with the inner conduit 14 thereof in a retracted position. By virtue of the retraction of the inner conduit 14, a certain degree of mixing of the oxygen and the fuel may be achieved prior to exit of the oxygen and the fuel from the burner 11. In order to achieve such a pre-mixing of the oxygen and the fuel, it is however, also possible, as illustrated in FIG. 7, to provide the inner conduit 14 with perforations 16 in the region of the oxygen outlet 12. It is pointed out that it is further possible to have the inner conduit 14 slidably mounted with respect to the outer conduit 15 and to additionally provide the inner conduit 14 with the perforations 16 in the region of the oxygen outlet 12.

As best seen from FIG. 5, it is possible to fasten wire to the outer surface of the inner conduit 14 of a burner 11. Such wire, which is identified by reference numeral 22, may serve as a spacing element to maintain a certain spacing between the inner conduit 14 and the outer conduit 15. It is of particular advantage for the wire 22 to be arranged in the form of a spiral or coil since, in this manner, a spinning or swirling motion may be imparted to the fuel leaving the burner 11. The spinning or swirling motion may enhance mixing of the oxygen and the fuel.

As may be seen from FIG. 2, the burners of the burner arrangement 6 are advantageously inclined downwardly at a small angle. Furthermore, cooling means may be provided in the peripheral wall 2 of the shaft furnace 1 to enhance the formation of the wall-like protuberances 9. The cooling means, which are here shown as being in the form of conduits for supplying water or air to the peripheral wall 2 of the furnace 1, are identified by the reference numeral 21. The cooling means 21 are favorably situated adjacent the wall-like protuberances 9 or in the region of the outlets 12 and 13 for oxygen and fuel, respectively.

With the burners of the type described above, an ideal, lens-shaped melting flame 7 may be generated interiorly of the fire-resisting lining of the shaft furnace 1, which lining is protected by a protective shell.

As opposed to the known water-cooled burners, the burner arrangement according to the invention undergoes practically no wear, is simple and economical, is easy to maintain, may be operated using simply an overall regulatory system and is completely reliable and free of risk. When a melting operation is interrupted, the outlets for the oxygen and the fuel may be cooled and kept from becoming blocked by blowing in nitrogen or compressed air after shutting off the flow of oxygen and fuel.

For a shaft furnace having a diameter of 3 meters it is possible, for example, to use 24 copper burners such as the burners 11. The inner conduits corresponding to the conduit 14 may have an outer diameter of 10 millimeters whereas the outer conduits corresponding to the conduits 15 may have an outer diameter of 14 millimeters. Both the inner and outer conduits may have a wall thickness of 1 millimeter.

It will be understood that each of the elements described above, or two or more together, may also find a useful application in other types of methods and arrangements differing from the types described above.

While the invention has been illustrated and described as embodied in a method of melting scrap, sponge iron, pellets or the like and an apparatus therefor, it is not intended to be limited to the details shown since various modifications and structural changes may be made without departing in any way from the spirit of the present invention.

Without further analysis the foregoing will so fully reveal the gist of the present invention that others can, by applying current knowledge, readily adapt it for various applications without omitting features that from the standpoint of prior art fairly constitute essential characteristics of the generic or specific aspects of this invention.

What is claimed as new and desired to be protected by Letters Patent is set forth in the appended claims:

1. A melting method, comprising the steps of confining a charge of a material selected from the group consisting of scrap, sponge iron and pellets in a melting zone having a peripheral region; applying heat to a lower end of the charge to gradually melt the material thereof, including concurrently introducing a stream of a combustion-supporting substance and a layer of a combustible hydrocarbon substance which at least partly surrounds the stream into the melting zone to obtain a combustible mixture of the substances in the melting zone, and combusting the mixture in the melting zone outside the peripheral region thereof; and forming at least one protuberance of a solidified quantity of the molten material at the peripheral region of the melting zone to serve as a support for the charge, including passing the stream and the layer through the peripheral region of the melting zone for the layer to cool the peripheral region to an extent sufficient for the molten material present at the peripheral region of the melting zone to solidify and thereby form the protuberance.

2. A method as defined in claim 1, wherein said introducing step includes imparting spin to at least one of the stream and the layer prior to the passing step.

3. A method as defined in claim 1, and further comprising the step of discontinuing the combusting step, including substituting a gas selected from the group consisting of nitrogen and compressed air for at least the combustible substance.

4. A method as defined in claim 1, wherein said forming step includes controlling the introducing to thereby regulate the dimensions of the protuberance.

5. A method as defined in claim 1, wherein said confining step includes bounding the melting zone by a peripheral wall; and wherein said forming step includes cooling a portion of the peripheral wall which is adjacent the peripheral region of the melting zone.

* * * * *